(12) United States Patent
Wyatt et al.

(10) Patent No.: US 7,844,876 B2
(45) Date of Patent: Nov. 30, 2010

(54) TEMPERATURE SAMPLING IN ELECTRONIC DEVICES

(75) Inventors: David Wyatt, San Jose, CA (US); Christopher Cox, Placerville, CA (US); Howard David, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 282 days.

(21) Appl. No.: 11/648,122

(22) Filed: Dec. 29, 2006

(65) Prior Publication Data

US 2008/0039981 A1 Feb. 14, 2008

(51) Int. Cl.
*G01R 31/30* (2006.01)

(52) U.S. Cl. ............... 714/745; 714/47; 714/708; 714/718; 714/721; 365/201; 365/212; 316/103; 711/105; 702/130; 700/299

(58) Field of Classification Search ............ None
See application file for complete search history.

(56) References Cited

U.S. PATENT DOCUMENTS

| | | | |
|---|---|---|---|
| 6,349,269 B1 | 2/2002 | Wallace, Jr. | |
| 6,438,503 B1 * | 8/2002 | Chiang | 702/132 |
| 6,564,288 B2 * | 5/2003 | Olarig et al. | 711/105 |
| 6,662,136 B2 | 12/2003 | Lamb et al. | |
| 6,701,272 B2 * | 3/2004 | Cooper et al. | 702/132 |
| 6,871,119 B2 | 3/2005 | Samson et al. | |
| 7,099,735 B2 | 8/2006 | Jain et al. | |
| 7,114,087 B2 | 9/2006 | Watnik et al. | |
| 7,222,052 B2 | 5/2007 | Coulson et al. | |
| 7,280,301 B1 * | 10/2007 | Jackson et al. | 360/69 |
| 7,400,945 B2 | 7/2008 | Radhakrishnan et al. | |
| 7,412,614 B2 * | 8/2008 | Ku | 713/321 |
| 7,428,644 B2 * | 9/2008 | Jeddeloh et al. | 713/300 |

(Continued)

OTHER PUBLICATIONS

Non Final Office Action received for U.S. Appl. No. 11/648,122 dated Mar. 3, 2009, 18 pages.

(Continued)

*Primary Examiner*—John P Trimmings
(74) *Attorney, Agent, or Firm*—Caven & Aghevli LLC

(57) ABSTRACT

In some embodiments the continuous measuring of temperature in remote memory devices operating within an electrically noisy environment is facilitated by coordinating the progressive approximation of temperature within quiescent periods of non-activity as known by a memory controller.

24 Claims, 8 Drawing Sheets

U.S. PATENT DOCUMENTS

| | | |
|---|---|---|
| 7,480,586 B2 * | 1/2009 | Johns et al. ............... 702/130 |
| 7,522,434 B2 * | 4/2009 | Nahar et al. ............... 363/65 |
| 2002/0147564 A1 | 10/2002 | Lamb et al. |
| 2004/0131104 A1 * | 7/2004 | Seferian ............... 374/178 |
| 2004/0199730 A1 | 10/2004 | Eggers et al. |
| 2004/0260957 A1 | 12/2004 | Jeddeloh et al. |
| 2006/0010353 A1 | 1/2006 | Haugh |
| 2006/0066384 A1 | 3/2006 | Jain et al. |
| 2006/0146629 A1 * | 7/2006 | Lee ............... 365/222 |
| 2006/0190210 A1 | 8/2006 | Mukherjee |
| 2006/0242447 A1 | 10/2006 | Radhakrishnan et al. |
| 2007/0019719 A1 * | 1/2007 | McCandless ............... 375/224 |
| 2007/0140030 A1 | 6/2007 | Wyatt |
| 2007/0223299 A1 * | 9/2007 | Egerer et al. ............... 365/222 |
| 2008/0001634 A1 | 1/2008 | Arabi et al. |
| 2008/0043808 A1 | 2/2008 | Hsu et al. |
| 2008/0059111 A1 * | 3/2008 | Sri-Jayantha et al. ....... 702/132 |
| 2008/0126690 A1 | 5/2008 | Rajan et al. |
| 2008/0137256 A1 * | 6/2008 | Foster ............... 361/103 |
| 2008/0221826 A1 | 9/2008 | Johns et al. |

OTHER PUBLICATIONS

Final Office Action received for U.S. Appl. No. 11/502,235, mailed on Sep. 23, 2009, 7 pages.

Non-final Office Action received for U.S. Appl. No. 11/502,235, mailed on May 26, 2009, 9 pages.

Non-final Office Action received for U.S. Appl. No. 11/502,235, mailed on Dec. 4, 2008, 13 pages.

* cited by examiner

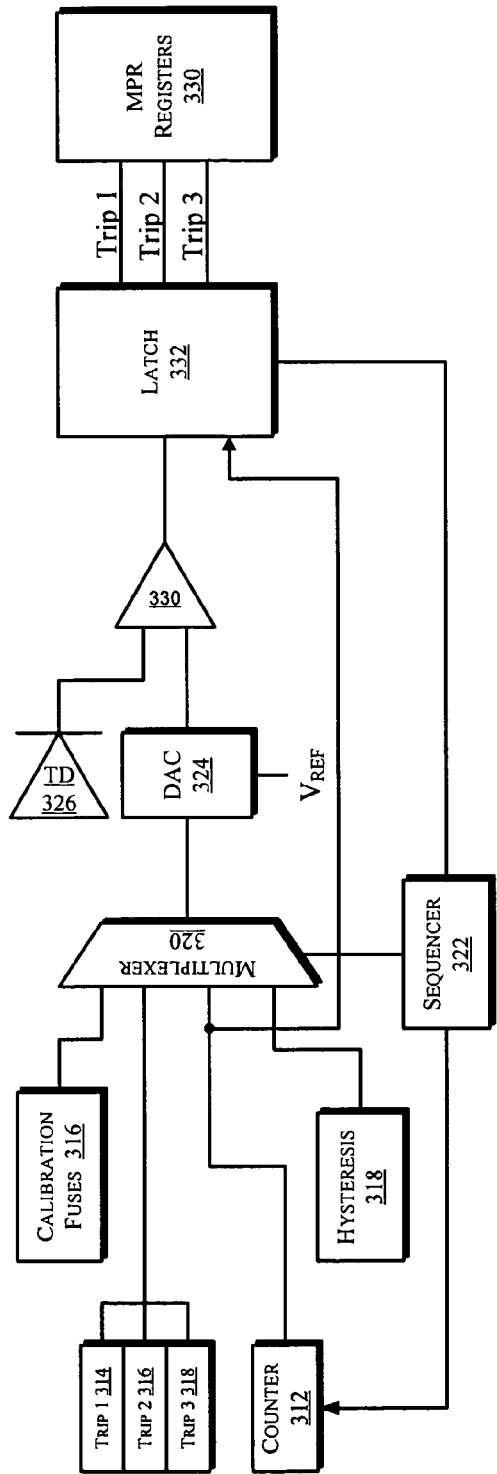
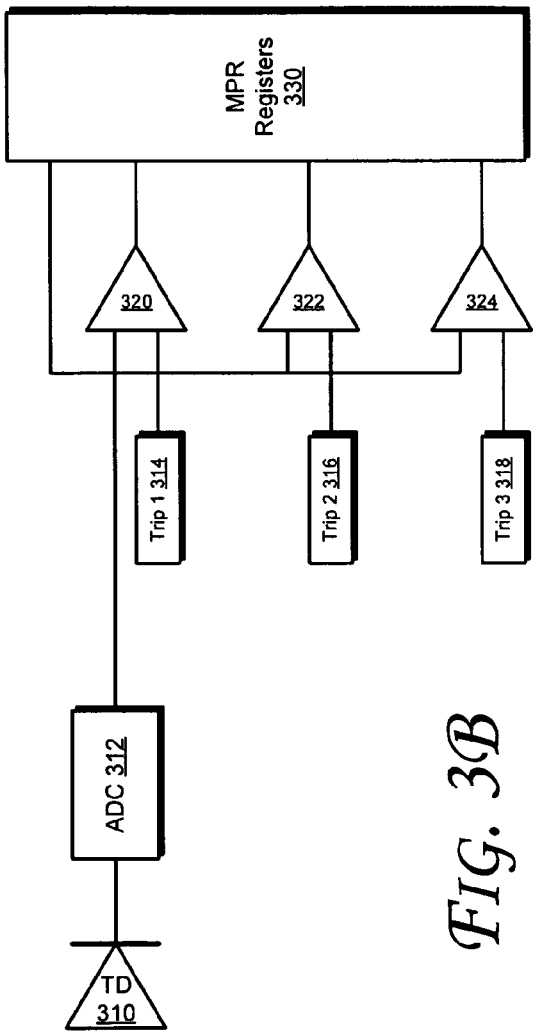
FIG. 3A
FIG. 3B

TEMPERATURE SAMPLING IN ELECTRONIC DEVICES

BACKGROUND

The subject matter described herein relates generally to the field of electronics and more particularly to temperature sampling in electronic devices.

Electronic devices may benefit from accurate temperature sampling. For example, in many integrated circuit devices heat generation is proportional to the speed at which the integrated circuit is operated. Accurate temperature detection may permit designers of integrated circuit devices to develop control techniques that balance operating speeds with heat dissipation capabilities.

BRIEF DESCRIPTION OF THE DRAWINGS

The detailed description is described with reference to the accompanying figures.

FIGS. 3A and 3B are schematic illustrations of signal processing logic for temperature sampling in accordance with some embodiments.

DETAILED DESCRIPTION

Described herein are exemplary systems and methods for temperature sampling in electronic devices. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
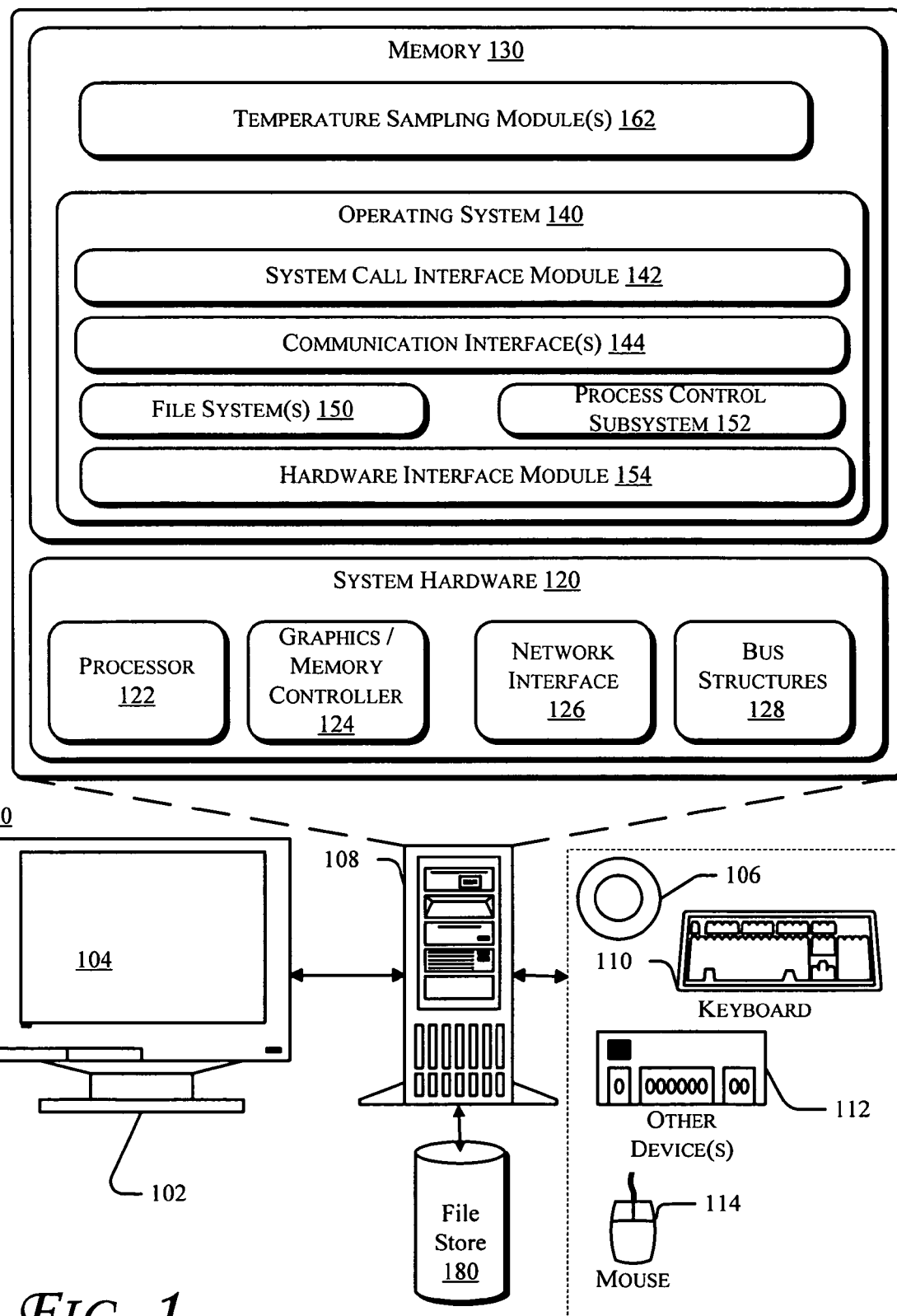
FIG. 1 is a schematic illustration of an exemplary computing device adapted to perform temperature sampling operations in accordance with some embodiments.

FIG. 1 is a schematic illustration of a computing system 100 adapted to perform temperature sampling operations according to some embodiments. In one embodiment, system 100 includes a computing device 108 and one or more accompanying input/output devices including a display 102 having a screen 104, one or more speakers 106, a keyboard 110, one or more other I/O device(s) 112, and a mouse 114. The other I/O device(s) 112 may include a touch screen, a voice-activated input device, a track ball, and any other device that allows the system 100 to receive input from a user.

The computing device 108 includes system hardware 120 and memory 130, which may be implemented as random access memory and/or read-only memory. A file store 180 may be communicatively coupled to computing device 108. File store 180 may be internal to computing device 108 such as, e.g., one or more hard drives, CD-ROM drives, DVD-ROM drives, or other types of storage devices. File store 180 may also be external to computer 108 such as, e.g., one or more external hard drives, network attached storage, or a separate storage network.

System hardware 120 may include one or more processors 122, graphics/memory controllers 124, network interfaces 126, and bus structures 128. In one embodiment, processor 122 may be embodied as an Intel® Pentium IV® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics/memory controller 124 may function as an adjunct processor that manages graphics and/or video operations. Graphics/memory controller 124 may be integrated onto the motherboard of computing system 100 or may be coupled via an expansion slot on the motherboard.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 130 may include an operating system 140 for managing operations of computing device 108. In one embodiment, operating system 140 includes a hardware interface module 154 that provides an interface to system hardware 120. In addition, operating system 140 may include a file system 150 that manages files used in the operation of computing device 108 and a process control subsystem 152 that manages processes executing on computing device 108.

Operating system 140 may include (or manage) one or more communication interfaces that may operate in conjunction with system hardware 120 to transceive data packets and/or data streams from a remote source. Operating system 140 may further include a system call interface module 142 that provides an interface between the operating system 140 and one or more application modules resident in memory 130. Operating system 140 may be embodied as a UNIX operating system or any derivative thereof (e.g., Linux, Solaris, etc.) or as a Windows® brand operating system, or other operating systems.

In various embodiments, the computing device 108 may be embodied as a personal computer, a laptop computer, a personal digital assistant, a mobile telephone, an entertainment device, or another computing device.

In one embodiment, memory 130 includes one or more temperature sampling modules 162 to manage temperature sampling operations in computing system 100. In one embodiment, a temperature sampling module 162 may include logic instructions encoded in a computer-readable medium which, when executed by processor 122 or graphics/memory controller 124, cause the processor 122 or graphics/memory controller 124 to implement temperature sampling operations.

Figure 2:
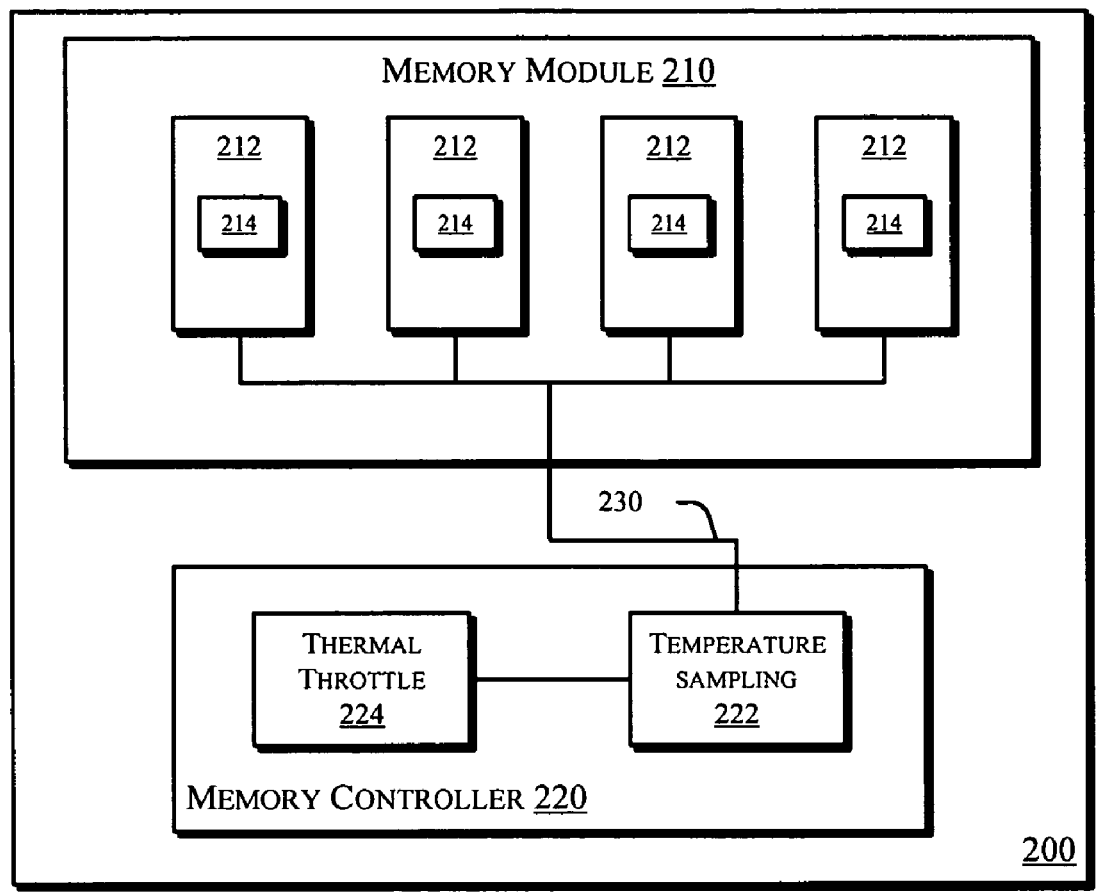
FIG. 2 is a schematic illustration an apparatus adapted to perform temperature sampling in accordance with some embodiments.

FIG. 2 is a schematic illustration an apparatus 200 adapted to perform temperature sampling in accordance with some embodiments. Referring to FIG. 2, apparatus 200 comprises a memory module 210 and a memory controller 220 coupled to the memory module 210 by a communication bus 230.

Memory module 210 comprises one or more memory devices 212, which may be embodied as random access memory devices such as, e.g., dual in-line memory modules (DIMMs), single in-line memory modules (SIMMs) or the like. Memory devices 212 comprise one or more temperature detectors 214 such as, e.g., a thermal diode, a thermocouple or the like. Temperature detectors 214 may be integrated onto the semiconductor die of memory devices 212 or may be constructed as a separate component.

Memory controller 220 may correspond to a portion of graphics/memory controller 124. In one embodiment memory controller 220 comprises a sensor processor module 224 and a temperature sampling module 224. Temperature sampling module 224 may correspond to temperature sampling module 162.

Communication bus 230 may be embodied as any suitable communication bus such as, e.g. a Double-Data Rate Synchronous DRAM memory bus, or the like.

The one or more temperature detectors 214 generate electrical signals indicative of a temperature proximate the memory device(s) 212 to which the temperature detectors 214 are coupled. Temperature sampling module 222 may include logic to generate digital signals from the signal(s) generated by temperature detectors 214. FIGS. 3A and 3B are schematic illustrations of signal processing logic for temperature sampling in accordance with some embodiments.

A first embodiment is depicted in FIG. 3A. Referring first to FIG. 3A, a counter signal 312 and one or more trip signals 314, 316, 318 are input to a multiplexer 320. Multiplexer 320 may also receive input signals from one or more calibration fuses 316 and a hysteresis correction module 318 and a sequencer 322. The output from multiplexer 320 is input to a digital to analog converter (DAC) 324. Digital to analog converter (DAC) 324 may also receive a reference voltage $V_{REF}$ as an input.

DAC 324 generates an output signal that is representative of one of inputs 314, 316, 318. A comparator 330 receives the output signal from DAC 324 and a signal from a temperature detector 326. The output from comparator is latched in latch 332 and eventually stored in memory protection registers (MPR) 330.

A second embodiment is depicted in FIG. 3B. Referring to FIG. 3B, a signal from thermal diode 310, which may correspond to one of the thermal detectors 214, is input to an analog to digital converter (ADC) 312, which outputs a digital signal representative of the analog signal generated by thermal diode 310. The digital signal output from ADC 312 is input to comparators 320, 322, 324 and to memory protection registers (MPR) 330. Each comparator 320, 322, 324 also receives an input voltage, referred to as a trip voltage, 314, 316, and 318, respectively. The output signals from comparators 320, 322, 324 are input to MPR 330.

Figure 4:
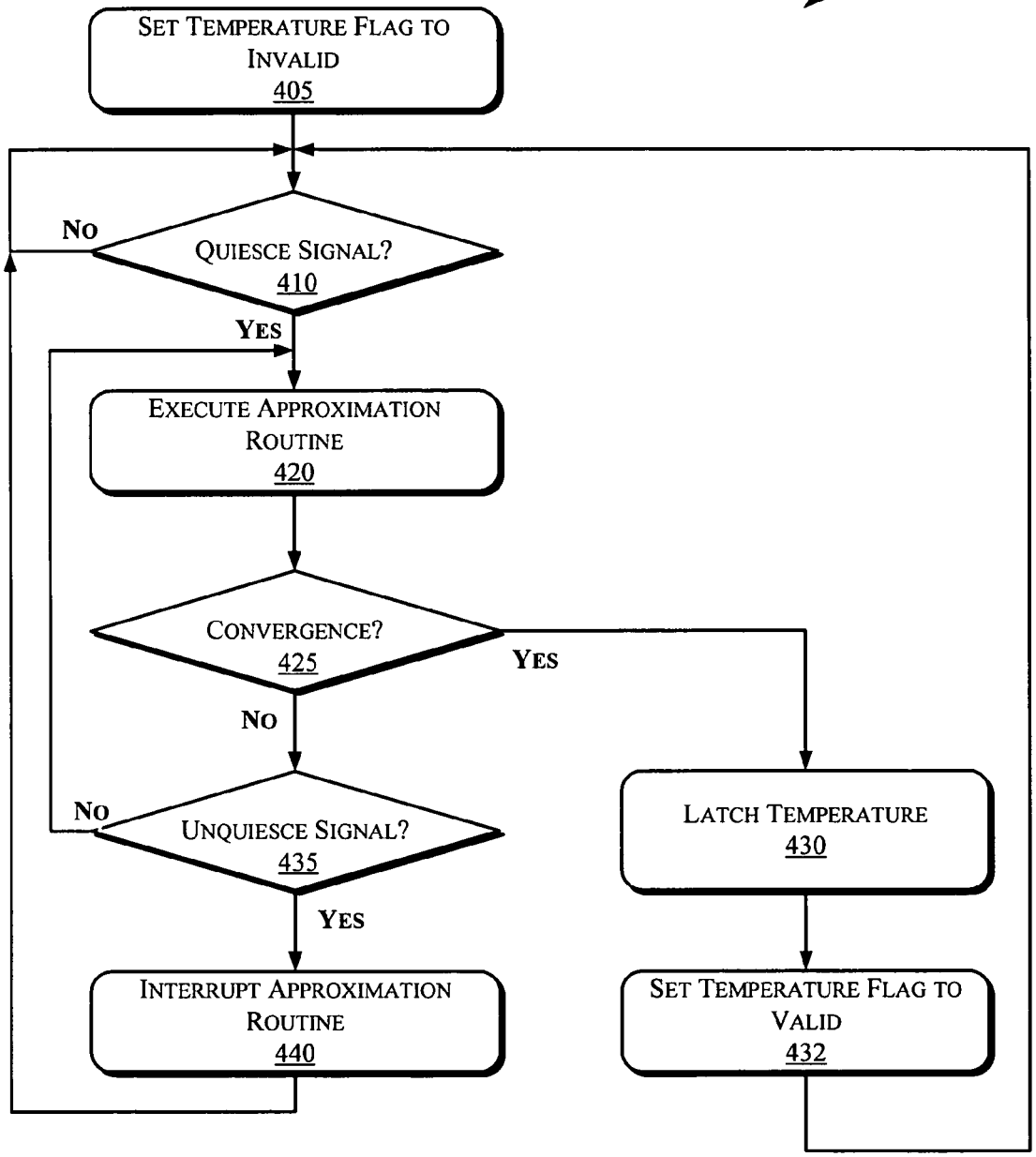
FIGS. 4-6 are flowcharts illustrating temperature sampling operations performed in accordance with some embodiments.
Figure 5:
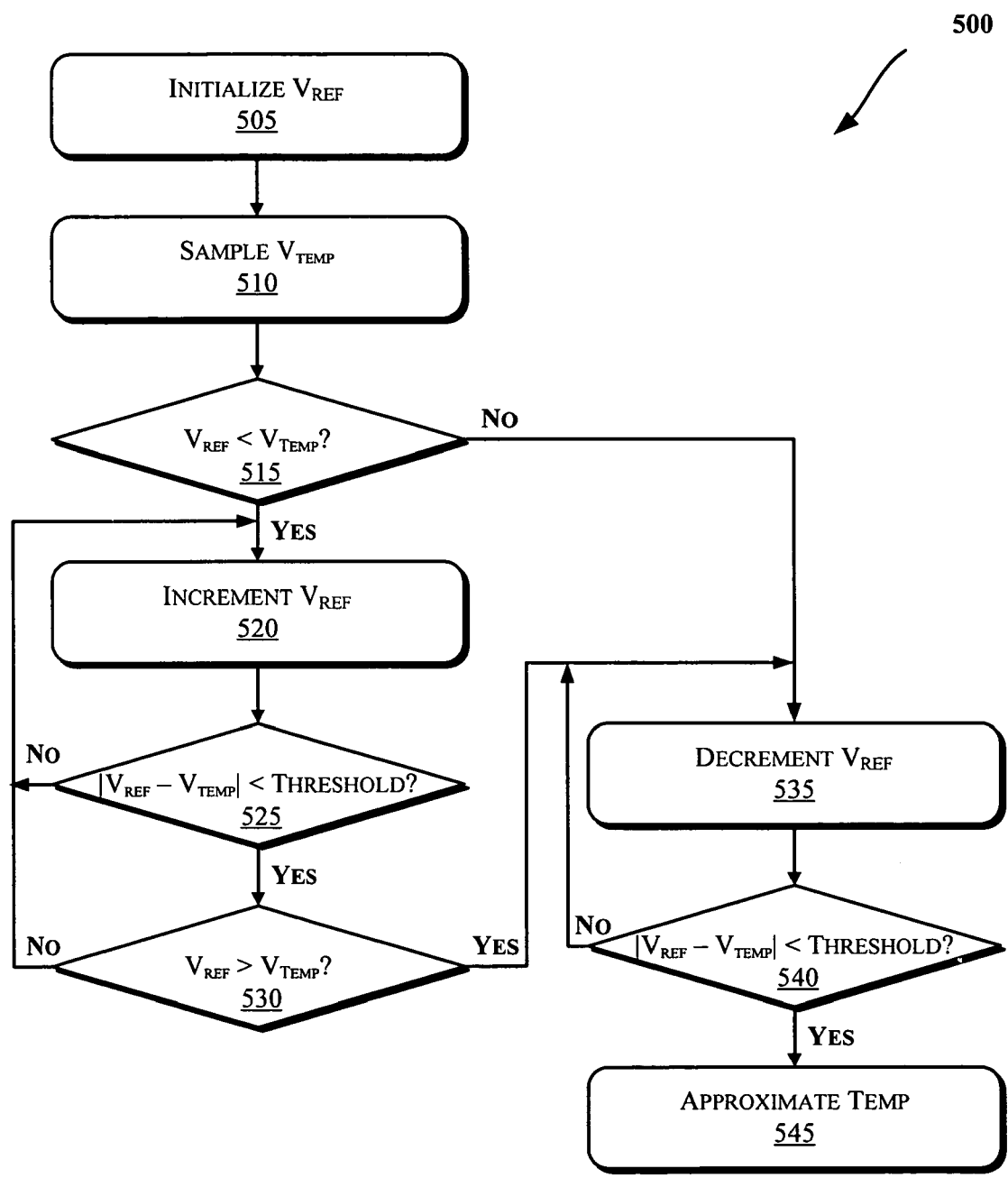
Figure 6:
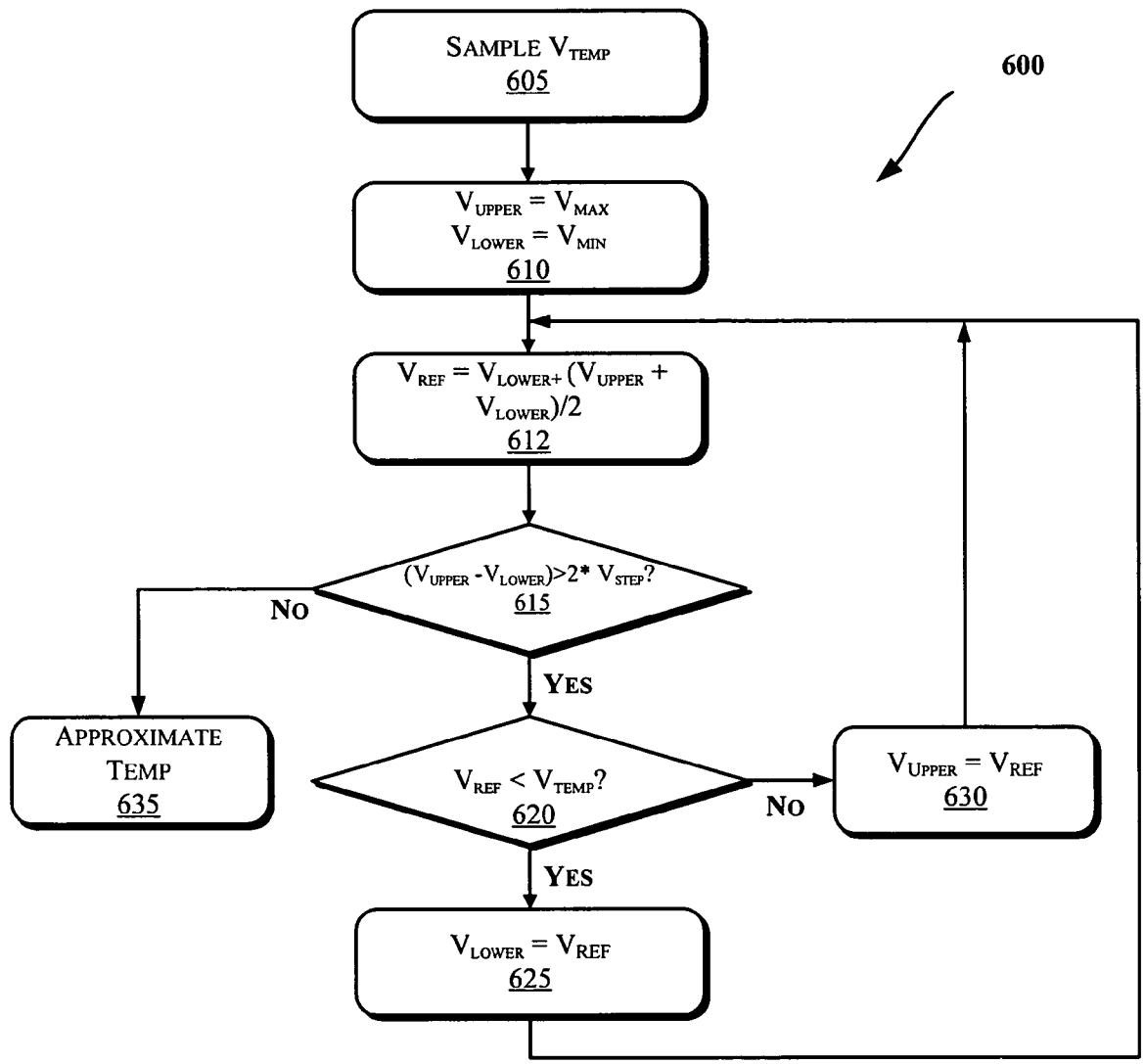

Data stored in the memory protections registers 330 may be used by temperature sampling module 222. FIGS. 4-6 are flowcharts illustrating temperature sampling operations performed in accordance with some embodiments. In one embodiment, the operations of FIGS. 4-6 may be implemented as logic instructions stored in a computer-readable medium such as, e.g., a memory module. Referring first to FIG. 4, at operation 405 a temperature flag is set to invalid. In some embodiments, the temperature flag may be stored in a suitable memory location.

In some embodiments, temperature sampling operations are conducted during time periods in which communication activity between one or more of the memory module(s) 212 and the memory controller 220 are quiesced. In some embodiments, memory bus 230 is monitored for a quiesce signal that is directed to one or more of the memory modules. For example, some memory devices implement a quiesce cycle on a periodic basis to perform impedance calibration. In other embodiments, the quiesce cycle may be initiated specifically to implement a temperature sampling routine.

If, at operation 410, a quiesce signal is not detected then control remains with operation 410. By contrast, if at operation 410 a quiesce signal is detected, then control passes to operation 420 and a temperature approximation routine is executed. Embodiments of temperature approximation routines are described below with reference to FIGS. 5-6.

If, at operation 425 the temperature approximation routine has converged to a temperature approximation, then control passes to operation 430 and the temperature is latched internally so that the converged value can be conveyed by a host controller read, and the temperature flag is set in 432 to a value that indicates the temperature reading for the sampled memory module(s) is valid, thereafter the process returns to 410 to continue capturing the temperature. By contrast, if at operation 425 the temperature approximation has not converged on a temperature reading within the given tolerance, then control passes to operation 435.

If, at operation 435, no unquiesce signal is detected on communication bus 230, then control passes back to operation 420 and the approximation routine continues execution. By contrast, if at operation 435 an unquiesce signal is detected on communication bus 230, then control passes to operation 440 and the temperature approximation routine is interrupted. Control then passes back to operation 410 and the communication bus is monitored for another quiesce signal.

Figure 7:
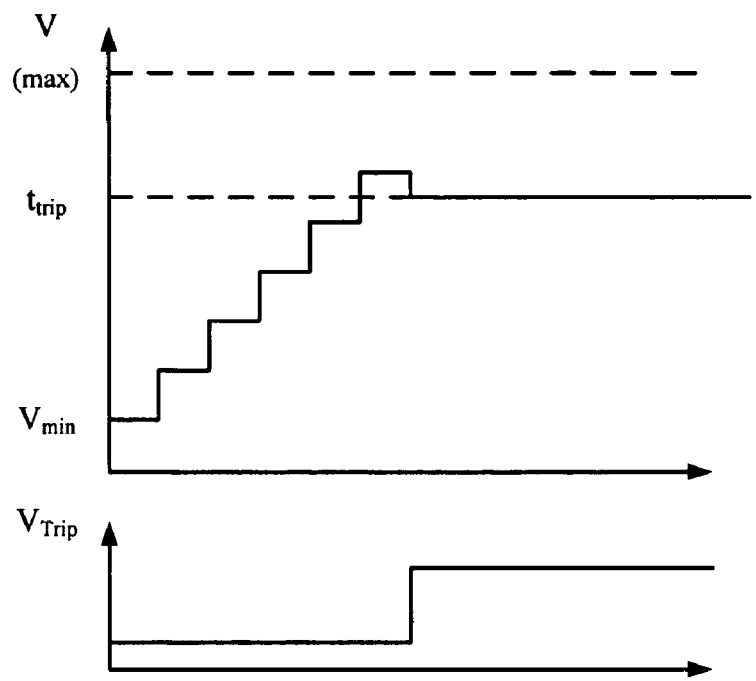
FIGS. 7-8 are schematic illustrations of approximation algorithms for temperature sampling in accordance with some embodiments.

FIG. 5 is a flowchart illustrating operations in one embodiment of a temperature approximation routine that implements a successive approximation algorithm, and FIG. 7 is graphical depiction of the temperature approximation algorithm of FIG. 5. Referring to FIG. 5, at operation 505 a reference voltage $V_{REF}$ is initialized to a minimum voltage level $V_{MIN}$. At operation 510 a voltage reading is taken from a temperature detector 214.

If, at operation 515, the voltage $V_{REF}$ is less than a voltage $V_{TEMP}$ generated by the temperature detector 214 sampled in operation 510, then control passes to operation 520 and the reference voltage $V_{REF}$ is incremented. In some embodiments, $V_{REF}$ is incremented by a fixed amount such as, e.g., 0.5 volts.

If, at operation 525 the difference between the reference voltage $V_{REF}$ and the voltage $V_{TEMP}$ generated by the temperature detector 214 is not less than a threshold value, then control passes back to operation 520 and the reference voltage $V_{REF}$ is incremented. The thresholds may indicate an upper and lower bound of error tolerance, which when the temperature is within these thresholds indicate that the approximation process has converged on a final temperature reading, within the given range of tolerance. The threshold may be fixed or dynamic, and may be an absolute voltage value or may be a percentage of the voltage range of the electronic device. Operations 520-525 are repeated until at operation 525 the difference between the reference voltage $V_{REF}$ and the voltage $V_{TEMP}$ generated by the temperature detector 214 is less than a threshold value, then control passes to operation 530.

If, at operation 530, the voltage $V_{REF}$ is greater than a voltage $V_{TEMP}$ generated by the temperature detector 214 sampled in operation 510, then control passes to operation 535 and the reference voltage $V_{REF}$ is decremented. In some embodiments, $V_{REF}$ is decremented by a fixed amount such as, e.g., 0.25 volts.

If, at operation 540 the difference between the reference voltage $V_{REF}$ and the voltage $V_{TEMP}$ generated by the temperature detector 214 is not less than a threshold value, then control passes back to operation 535 and the reference voltage $V_{REF}$ is decremented. The threshold may be fixed or dynamic, and may be an absolute voltage value or may be a percentage of the voltage range of the electronic device. Operations 535-540 are repeated until at operation 540 the difference between the reference voltage $V_{REF}$ and the voltage $V_{TEMP}$ generated by the temperature detector 214 is less than a threshold value, then control passes to operation 545 and the voltage $V_{TEMP}$ is approximated as the voltage $V_{REF}$.

Figure 8:
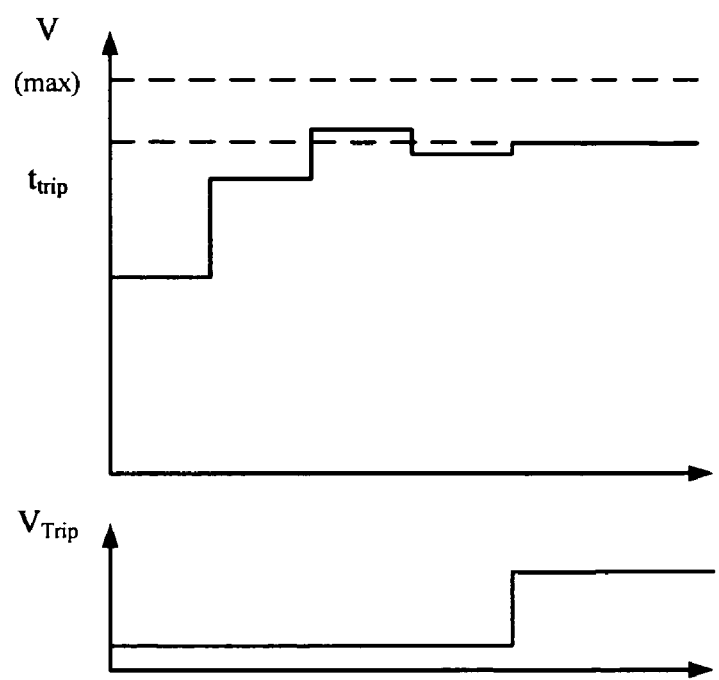

FIG. 6 is a flowchart illustrating operations in one embodiment of a temperature approximation routine that implements a binary approximation algorithm, and FIG. 8 is graphical depiction of the temperature approximation algorithm of FIG. 6. Referring to FIG. 6, operation 605 a voltage reading is taken from a temperature detector 214. At operation 610 upper and lower voltage limits for the approximation routine are set. In the embodiment depicted in FIG. 6 the upper limit $V_{UPPER}$ is set to the maximum voltage $V_{MAX}$ of the electronic device, and the lower limit $V_{LOWER}$ is set to the minimum voltage $V_{MIN}$ of the electronic device.

At operation 612 a reference voltage $V_{REF}$ is calculated. If, at operation 615, the difference between the upper voltage limit voltage $V_{UPPER}$ and the lower voltage limit $V_{LOWER}$ is less than twice a voltage increment $V_{STEP}$, then control passes to operation 635 and the temperature is approximated. In some embodiments, the temperature may be approximated by first setting the voltage $V_{TEMP}$ equal to the voltage $V_{REF}$, then transforming the voltage reading back to a temperature.

By contrast, if at operation 615 the difference between the upper voltage limit voltage $V_{UPPER}$ and the lower voltage limit $V_{LOWER}$ is not less than twice a voltage increment $V_{STEP}$, then control passes to operation 620.

If, at operation 620 the reference voltage $V_{REF}$ is less than the voltage $V_{TEMP}$ generated by the temperature detector 214, then control passes to operation 625 and the lower voltage limit $V_{LOWER}$ is set to the reference voltage $V_{REF}$. By contrast, if at operation 620 the reference voltage $V_{REF}$ is not less than the voltage $V_{TEMP}$ generated by the temperature detector 214, then control passes to operation 625 and the lower voltage limit $V_{UPPER}$ is set to the reference voltage $V_{REF}$. Control then passes back to operation 612.

Operations 612-635 are repeated until at operation 615, the difference between the upper voltage limit voltage $V_{UPPER}$ and the lower voltage limit $V_{LOWER}$ is less than twice a voltage increment $V_{STEP}$.

Figure 9:
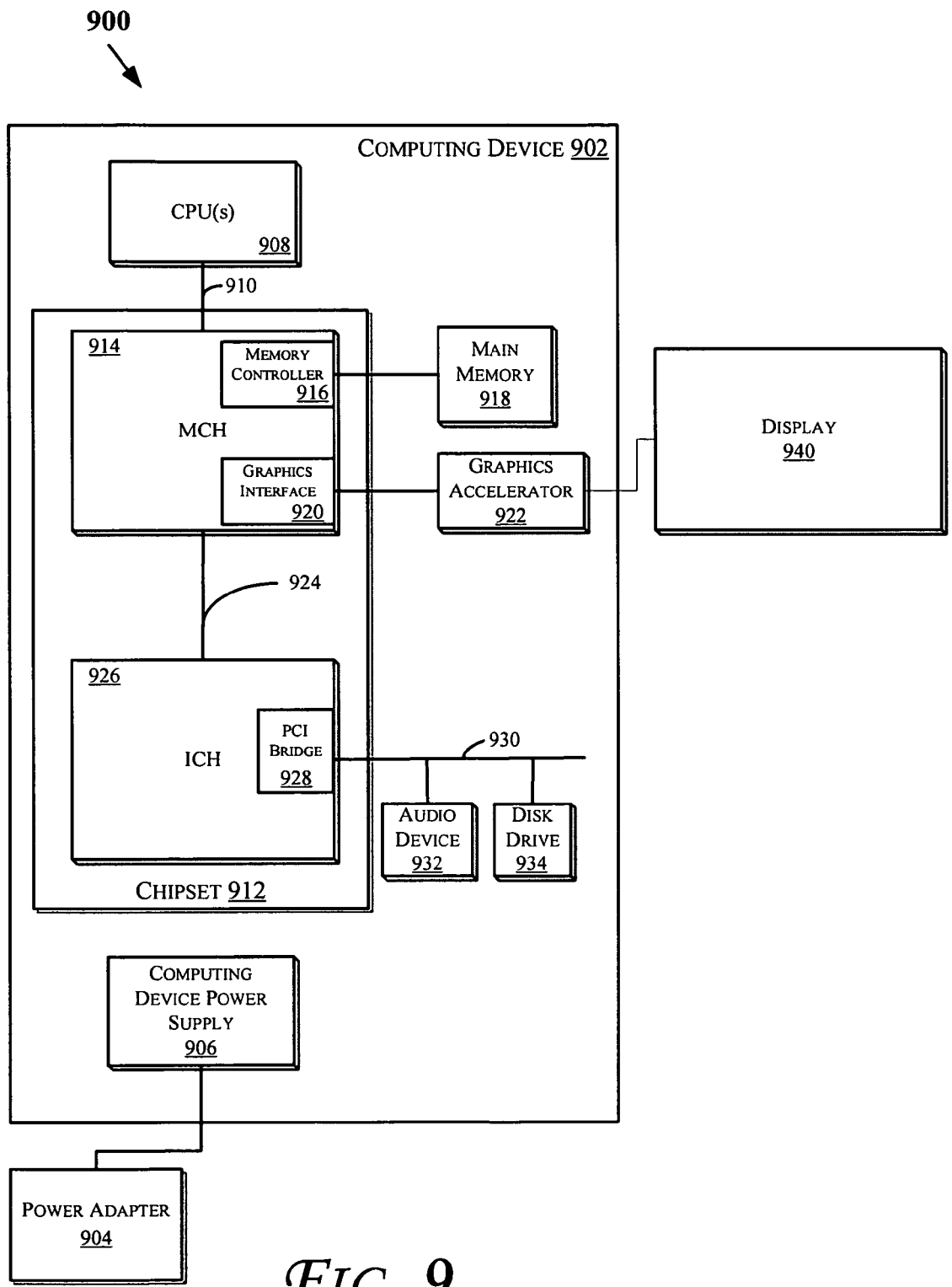
FIG. 9 is a schematic illustration of a computing device in accordance with some embodiments.

FIG. 9 is a schematic illustration of a computer system 900 in accordance with some embodiments. The computer system 900 includes a computing device 902 and a power adapter 904 (e.g., to supply electrical power to the computing device 902). The computing device 902 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 902 (e.g., through a computing device power supply 906) from one or more of the following sources: one or more battery packs, an alternating current (AC) outlet (e.g., through a transformer and/or adaptor such as a power adapter 904), automotive power supplies, airplane power supplies, and the like. In some embodiments, the power adapter 904 may transform the power supply source output (e.g., the AC outlet voltage of about 110 VAC to 240 VAC) to a direct current (DC) voltage ranging between about 7 VDC to 12.6 VDC. Accordingly, the power adapter 904 may be an AC/DC adapter.

The computing device 902 may also include one or more central processing unit(s) (CPUs) 908 coupled to a bus 910. In some embodiments, the CPU 908 may be one or more processors in the Pentium® family of processors including the Pentium® II processor family, Pentium® III processors, Pentium® IV processors available from Intel® Corporation of Santa Clara, Calif. Alternatively, other CPUs may be used, such as Intel's Itanium®, XEON™, and Celeron® processors. Also, one or more processors from other manufactures may be utilized. Moreover, the processors may have a single or multi core design.

A chipset 912 may be coupled to the bus 910. The chipset 912 may include a memory control hub (MCH) 914. The MCH 914 may include a memory controller 916 that is coupled to a main system memory 918. The main system memory 918 stores data and sequences of instructions that are executed by the CPU 908, or any other device included in the system 900. In some embodiments, the main system memory 918 includes random access memory (RAM); however, the main system memory 918 may be implemented using other memory types such as dynamic RAM (DRAM), synchronous DRAM (SDRAM), and the like. Additional devices may also be coupled to the bus 910, such as multiple CPUs and/or multiple system memories.

The MCH 914 may also include a graphics interface 920 coupled to a graphics accelerator 922. In some embodiments, the graphics interface 920 is coupled to the graphics accelerator 922 via an accelerated graphics port (AGP). In some embodiments, a display (such as a flat panel display) 940 may be coupled to the graphics interface 920 through, for example, a signal converter that translates a digital representation of an image stored in a storage device such as video memory or system memory into display signals that are interpreted and displayed by the display. The display 940 signals produced by the display device may pass through various control devices before being interpreted by and subsequently displayed on the display.

A hub interface 924 couples the MCH 914 to an input/output control hub (ICH) 926. The ICH 926 provides an interface to input/output (I/O) devices coupled to the computer system 900. The ICH 926 may be coupled to a peripheral component interconnect (PCI) bus. Hence, the ICH 926 includes a PCI bridge 928 that provides an interface to a PCI bus 930. The PCI bridge 928 provides a data path between the CPU 908 and peripheral devices. Additionally, other types of I/O interconnect topologies may be utilized such as the PCI Express™ architecture, available through Intel® Corporation of Santa Clara, Calif.

The PCI bus 930 may be coupled to an audio device 932 and one or more disk drive(s) 934. Other devices may be coupled to the PCI bus 930. In addition, the CPU 908 and the MCH 914 may be combined to form a single chip. Furthermore, the graphics accelerator 922 may be included within the MCH 914 in other embodiments.

Additionally, other peripherals coupled to the ICH 926 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Hence, the computing device 902 may include volatile and/or nonvolatile memory.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:
a memory controller; and
logic to:
   detect a quiesce signal in a memory bus in the apparatus and one or more memory devices in the apparatus;
   initiate, in response to the quiesce signal, a temperature approximation routine; and
   set a temperature flag when the temperature approximation routine converges to a temperature approximation, and
   repeat the temperature approximation routine.

2. The apparatus of claim 1, wherein:
the one or more memory devices comprise one or more temperature detectors.

3. The apparatus of claim 2, further comprising:
logic to convert a voltage signal generated by the one or more temperature detectors to a digital signal; and
logic to compare the digital signal to one or more trip values.

4. The apparatus of claim 1, wherein the quiesce signal is originated by the memory controller to indicate quiescent conditions on the memory bus.

5. The apparatus of claim 1, wherein a non-quiescent condition on the memory bus is signaled by a combination of one or more specific signals from the memory controller, or the absence of the quiesce signal from the memory controller, or the non-quiescent condition as detected on the memory bus.

6. The apparatus of claim 1, wherein the temperature approximation routine compares a voltage generated by a temperature detecting device to one or more reference voltages.

7. The apparatus of claim 1, further comprising logic to:
detect a non-quiescent condition; and
interrupt the temperature approximation routine in response to the non-quiescent condition.

8. The apparatus of claim 1, further comprising logic to:
restart the temperature approximation routine in response to a non-quiescent condition.

9. The apparatus of claim 1, further comprising logic to adjust an operating parameter of the memory device in response to an output of the temperature approximation routine.

10. A method, comprising:
detect a quiesce signal in a memory bus or one or more memory devices;
initiating, in response to the quiesce signal, a temperature approximation routine; and
setting a temperature flag when the temperature approximation routine converges to a temperature approximation; and
repeating the temperature approximation routine.

11. The method of claim 10, wherein the quiesce signal is originated by a memory controller to indicate quiescent conditions on a memory bus.

12. The method of claim 10, wherein the temperature approximation routine compares a voltage generated by a temperature detecting device to one or more reference voltages.

13. The method of claim 10, further comprising:
detecting a non-quiescent condition; and
interrupting the temperature approximation routine in response to the non-quiescent condition.

14. The method of claim 13, further comprising:
restarting the temperature approximation routine in response to the non quiescent condition.

15. The method of claim 10, further comprising adjusting an operating parameter of the memory module in response to an output of the temperature approximation routine.

16. A method, comprising:
detecting a quiesce signal on a memory bus in an electronic device;
in response to the quiesce signal, initiating a temperature approximation routine during a quiescent cycle in a memory device; and
setting a temperature flag when the temperature approximation routine converges on a temperature within a range of tolerance, and
repeating the temperature approximation routine.

17. The method of claim 16, wherein the quiescent cycle is originated by a memory controller to quiesce operations on a memory bus to the memory device within a memory module.

18. The method of claim 17, wherein the temperature approximation routine compares a voltage generated by a temperature detecting device to one or more reference voltages.

19. The method of claim 16, further comprising:
interrupting the temperature approximation routine in response to a termination of the quiesce condition.

20. The method of claim 16, further comprising:
restarting the temperature approximation routine during a subsequent quiescent condition.

21. The method of claim 16, further comprising adjusting an operating parameter of the memory device in response to an output of the temperature approximation routine.

22. A system, comprising:
a processor;
a display;
one or more memory modules;
a memory controller;
a communication bus to couple the one or more memory modules to the memory controller; and
logic to:
detect a quiesce signal on the communication bus to one or more memory devices;
initiate, in response to the quiesce signal, a temperature approximation routine; and
set a temperature flag when the temperature approximation routine converges to a temperature approximation.

23. The system of claim 22, wherein:
the one or more memory modules comprise one or more memory devices; and
the one or more memory devices comprise one or more temperature detectors.

24. The system of claim 23, further comprising:
circuit to convert a voltage signal generated by the one or more temperature detectors to a digital signal; and
logic to compare the digital signal to one or more trip values.

* * * * *

UNITED STATES PATENT AND TRADEMARK OFFICE
CERTIFICATE OF CORRECTION

| | | |
|---|---|---|
| PATENT NO. | : 7,844,876 B2 | Page 1 of 1 |
| APPLICATION NO. | : 11/648122 | |
| DATED | : November 30, 2010 | |
| INVENTOR(S) | : Wyatt et al. | |

It is certified that error appears in the above-identified patent and that said Letters Patent is hereby corrected as shown below:

In column 8, line 60, in Claim 10, delete "detect" and insert -- detecting --, therefor.

Signed and Sealed this
Seventh Day of June, 2011

David J. Kappos
*Director of the United States Patent and Trademark Office*